(12) United States Patent
Park et al.

(10) Patent No.: US 8,891,048 B2
(45) Date of Patent: Nov. 18, 2014

(54) LIQUID CRYSTAL DISPLAY WITH INTEGRATED TOUCH SCREEN PANEL AND DRIVING METHOD THEREOF

(75) Inventors: Jin-Woo Park, Yongin (KR); Sang-Jin Pak, Yongin (KR); Jin-Hee Lee, Yongin (KR); Sang-Kwon Ha, Yongin (KR); Ji-Gong Lee, Yongin (KR); Hideo Yoshimura, Yongin (KR); Cheol-Min Kim, Yongin (KR); Joo-Hyung Lee, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 383 days.

(21) Appl. No.: 13/238,288

(22) Filed: Sep. 21, 2011

(65) Prior Publication Data

US 2012/0105752 A1    May 3, 2012

(30) Foreign Application Priority Data

Oct. 29, 2010  (KR) .................. 10-2010-0106734

(51) Int. Cl.
*G02F 1/1343* (2006.01)
*G02F 1/1333* (2006.01)
*G06F 3/044* (2006.01)
*G09G 3/36* (2006.01)

(52) U.S. Cl.
CPC ............ *G02F 1/13338* (2013.01); *G06F 3/044* (2013.01); *G09G 3/3648* (2013.01); *G02F 2001/134318* (2013.01); *G09G 2310/0218* (2013.01); *G09G 2310/0227* (2013.01)
USPC ............... 349/139; 349/12; 349/84; 349/143; 349/145; 349/149

(58) Field of Classification Search
USPC .......... 349/1, 12, 84, 139, 143, 145, 149, 151
See application file for complete search history.

(56) References Cited

U.S. PATENT DOCUMENTS 5,392,058 A    2/1995  Tagawa
6,177,918 B1   1/2001  Colgan et al.
(Continued)

FOREIGN PATENT DOCUMENTS

CN         1246638 A    3/2000
CN       101447176 A    6/2009
(Continued)

OTHER PUBLICATIONS

Korean Office Action Dated Jan. 8, 2013.

(Continued)

*Primary Examiner* — Jennifer Doan
(74) *Attorney, Agent, or Firm* — Lee & Morse, P.C.

(57) ABSTRACT

A liquid crystal display (LCD) with an integrated touch screen panel includes a plurality of pixels connected to a plurality of data lines and a plurality of gate lines, the gate lines being divided into a plurality of groups, a plurality of sensing electrodes, a plurality of common electrodes divided into a plurality of groups, a common electrode driver configured to simultaneously supply a driving signal to common electrodes within each group of the plurality of groups of the common electrodes, and to sequentially supply the driving signal to the plurality of groups of the common electrodes, and a gate driver configured to sequentially supply a gate signal to gate lines within each of the plurality of group of the gate lines.

12 Claims, 11 Drawing Sheets

(56) References Cited

U.S. PATENT DOCUMENTS

| | | | |
|---|---|---|---|
| 7,369,122 B2 * | 5/2008 | Cross et al. | 345/173 |
| 8,580,352 B2 * | 11/2013 | Sung et al. | 427/508 |
| 2004/0217945 A1 | 11/2004 | Miyamoto et al. | |
| 2006/0201931 A1 | 9/2006 | Lee et al. | |
| 2008/0309627 A1 | 12/2008 | Hotelling et al. | |
| 2009/0135209 A1 | 5/2009 | Takahashi | |
| 2009/0256818 A1 | 10/2009 | Noguchi et al. | |
| 2010/0182273 A1 | 7/2010 | Noguchi et al. | |

FOREIGN PATENT DOCUMENTS

| | | |
|---|---|---|
| JP | 2007-304342 A | 11/2007 |
| JP | 2008-90623 A | 4/2008 |
| JP | 2009-258182 A | 11/2009 |
| JP | 2010-092275 A | 4/2010 |
| KR | 10-2000-0016923 A | 3/2000 |
| KR | 10-2006-0002204 A | 1/2006 |
| KR | 10-2009-0019902 A | 2/2009 |
| KR | 10-2009-0055472 A | 6/2009 |
| TW | 2007-06971 | 2/2007 |
| TW | 2009-51548 | 12/2009 |
| WO | WO 2007/146779 A2 | 12/2007 |

OTHER PUBLICATIONS

Japanese Office Action Dated Mar. 26, 2013.
Korean Office action dated Jul. 16, 2012 for KR 10-2011-0037291. (Park et al.).
Chinese Office Action Dated Dec. 3, 2013.
Taiwanese Office Action Dated May 20, 2014.
European Search Report dated Sep. 24, 2014.

* cited by examiner

LIQUID CRYSTAL DISPLAY WITH INTEGRATED TOUCH SCREEN PANEL AND DRIVING METHOD THEREOF

BACKGROUND

1. Field

Example embodiments relate to a liquid crystal display (LCD), and more particularly, to a LCD with an integrated mutual capacitive touch screen panel and a driving method thereof.

2. Description of the Related Art

A touch screen panel is an input device that allows a user's instruction to be input by selecting an instruction content displayed on a screen of an image display or the like with a user's hand or object. The touch screen panel may be formed on a front face of the image display to convert a contact position into an electrical signal. For example, when the user's hand or object is directly contacting the touch screen panel at the contact position, the instruction content selected at the contact position is input as an input signal to the image display. Since such a touch screen panel can be substituted for a separate input device connected to an image display, e.g., a keyboard or mouse, its application fields have been gradually extended.

Touch screen panels may be divided, e.g., into resistive overlay touch screen panels, photosensitive touch screen panels, capacitive touch screen panels, and the like. For example, the capacitive touch screen panel converts a contact position into an electrical signal by sensing a change in capacitance formed between a conductive sensing pattern and an adjacent sensing pattern, ground electrode or the like, when a user's hand or object is in contact with the touch screen panel. Such a touch screen panel generally is attached to an outer surface of a flat panel display, e.g., a LCD or an organic light emitting display, so as to be implemented as a product.

However, when a touch screen panel is attached to an outer surface of a conventional flat panel display, an adhesive layer may be required between the touch screen panel and the flat panel display. As such, separate processes are required to form the touch screen panel, thereby increasing processing time and costs. Further, attachment of the touch screen panel to an outer surface of the flat panel display may increase an overall thickness of the flat panel display.

SUMMARY

Embodiments are therefore directed to a LCD with an integrated mutual capacitive touch screen panel and a driving method thereof, which substantially overcome one or more of the problems due to the limitations and disadvantages of the related art.

It is therefore a feature of an embodiment to provide a LCD with an integrated touch screen panel having an electrode used as a common electrode in the LCD and as a driving electrode in the touch screen panel.

It is therefore another feature of an embodiment to provide a LCD with an integrated touch screen panel capable of increasing touch sensitivity without degradation of image quality.

It is yet another feature of an embodiment to provide a driving method of a LCD with an integrated touch screen panel having one or more of the above features.

At least one of the above and other features and advantages may be realized by providing an LCD with an integrated touch screen panel, including a plurality of pixels connected to a plurality of data lines and a plurality of gate lines, the gate lines being divided into a plurality of groups, a plurality of sensing electrodes, a plurality of common electrodes divided into a plurality of groups, a common electrode driver configured to simultaneously supply a driving signal to common electrodes within each group of the plurality of groups of the common electrodes, and to sequentially supply the driving signal to the plurality of groups of the common electrodes, and a gate driver configured to sequentially supply a gate signal to gate lines within each of the plurality of group of the gate lines.

The LCD may further include first and second substrates spaced apart from each other, and a liquid crystal layer between the first and second substrates.

The sensing electrodes and the common electrodes may be positioned in a same layer or in different layers from each other at any one of the substrates.

The sensing electrodes and the common electrodes may intersect each other.

The common electrodes may define a plurality of groups divided in a regular sequence.

The gate lines may define a plurality of groups divided based on a predetermined sequence difference.

The supply of the driving signal by the common electrode driver and the supply of the gate signal by the gate driver may be alternately performed.

The common electrode driver may be configured to supply a same common voltage to all the common electrodes, except during a period in which the driving signal is supplied.

The driving signal may have a higher voltage than the common voltage.

For two groups divided into odd-numbered gate lines and even-numbered gate lines, the gate driver may be configured to sequentially supply a gate signal to gate lines included in each of the groups of gate lines.

The supply of the driving signal by the common electrode driver and the supply of the gate signal to each of the groups by the gate driver may be alternately performed.

For a plurality of groups obtained by respectively dividing odd-numbered common electrodes and even-numbered common electrodes based on sequence differences, the common electrode driver may simultaneously supply a driving signal to common electrodes included in each of the groups, sequentially supply the driving signal to the plurality of groups configured as the odd-numbered common electrodes, and sequentially supply the driving signal to the plurality of groups configured as the even-numbered common electrodes.

The supply of the driving signal to the plurality of groups configured as the odd-numbered common electrodes may be performed before the supply of the gate signal to the group configured as the odd-numbered gate lines, and the supply of the driving signal to the plurality of groups configured as the even-numbered common electrodes may be performed before the supply of the gate signal to the group configured as the even-numbered gate lines.

At least one of the above and other features and advantages may be realized by providing a driving method of an LCD with an integrated touch screen panel, the method including dividing common electrode patterns into a first plurality of groups based on a first predetermined sequence difference, dividing gate lines into a second plurality of groups based on a second predetermined sequence difference, simultaneously supplying a driving signal to common electrode patterns within a same group of the first plurality of groups and sequentially supplying the driving signal to the first plurality of groups, and sequentially supplying a gate signal to gate lines included in the second plurality of groups.

Supplying the driving and gate signals may include supplying the driving signal and the gate signal alternately.

Supplying the driving signal and the gate signal may include applying a same common voltage to all the common electrode patterns, except the period in which the driving signal is supplied.

The driving signal may have a higher voltage than the common voltage.

Supplying the driving signal and the gate signal may include dividing the gate lines into two groups of odd-numbered gate lines and even-numbered gate lines to have a sequence difference of two.

In the supplying of the driving signal and the gate signal, for a plurality of groups obtained by respectively dividing odd-numbered common electrode patterns and even-numbered common electrode patterns based on sequence differences, the common electrode driver may simultaneously supply a driving signal to common electrode patterns included in each of the groups, sequentially supply the driving signal to the plurality of groups configured as the odd-numbered common electrode patterns, and sequentially supply the driving signal to the plurality of groups configured as the even-numbered common electrode patterns.

In the supplying of the driving signal and the gate signal, the supply of the driving signal to the plurality of groups configured as the odd-numbered common electrode patterns may be performed before the supply of the gate signal to the group configured as the odd-numbered gate lines, and the supply of the driving signal to the plurality of groups configured as the even-numbered common electrode patterns may be performed before the supply of the gate signal to the group configured as the even-numbered gate lines.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
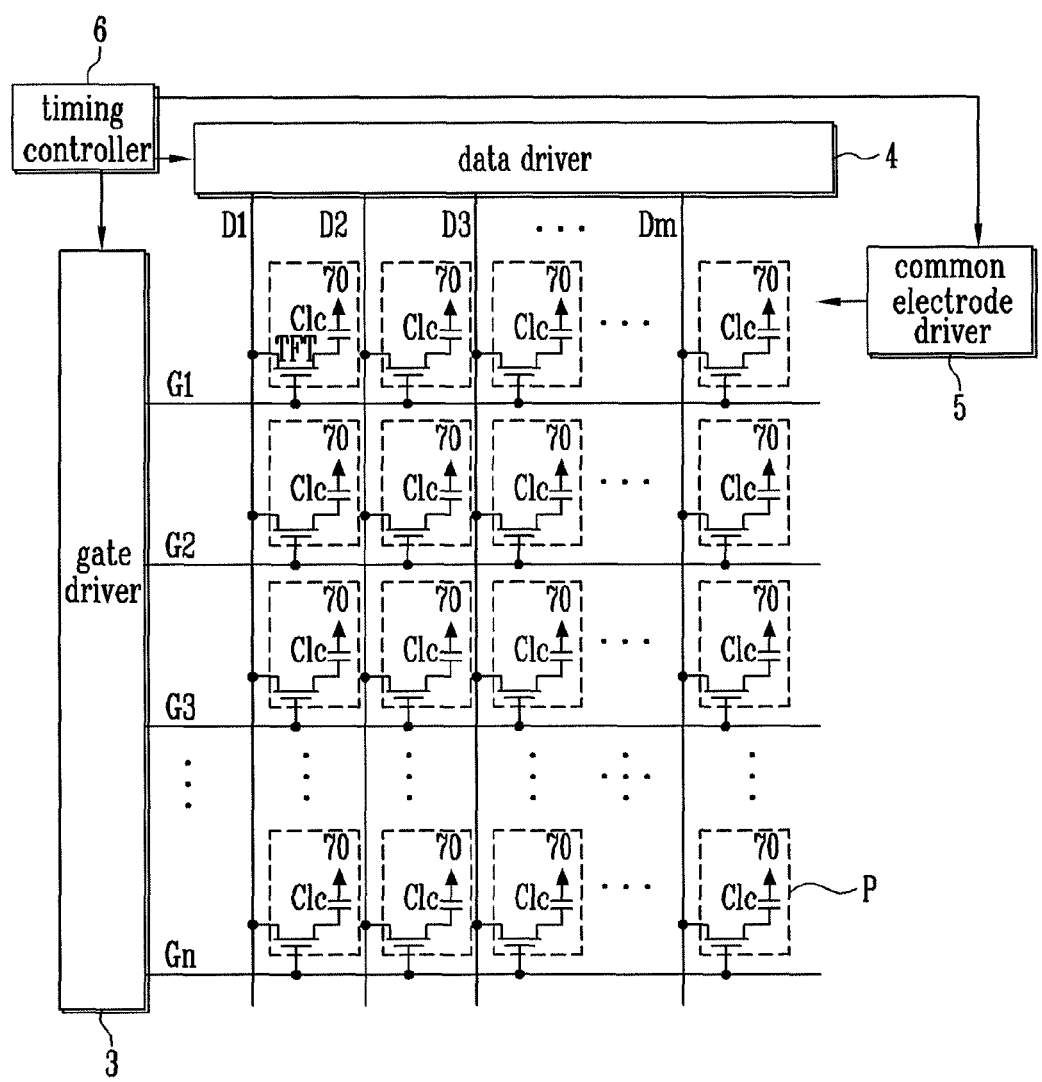
FIG. 1 illustrates a block diagram of a LCD with an integrated touch screen panel according to an embodiment.

Korean Patent Application No. 10-2010-0106734, filed on Oct. 29, 2010, in the Korean Intellectual Property Office, and Korean Patent Application No. 10-2011-0037291, filed on Apr. 21, 2011, are incorporated by reference herein in their entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when an element is referred to as being "on" another element or substrate, it can be directly on the other element or substrate, or intervening elements may also be present. In addition, it will also be understood that when an element is referred to as being "between" two elements, it can be the only element between the two elements, or one or more intervening elements may also be present. Also, when an element is referred to as being "connected to" another element, it can be directly connected to the other element or be indirectly connected to the other element with one or more intervening elements interposed therebetween. Like reference numerals refer to like elements throughout.

Figure 2:
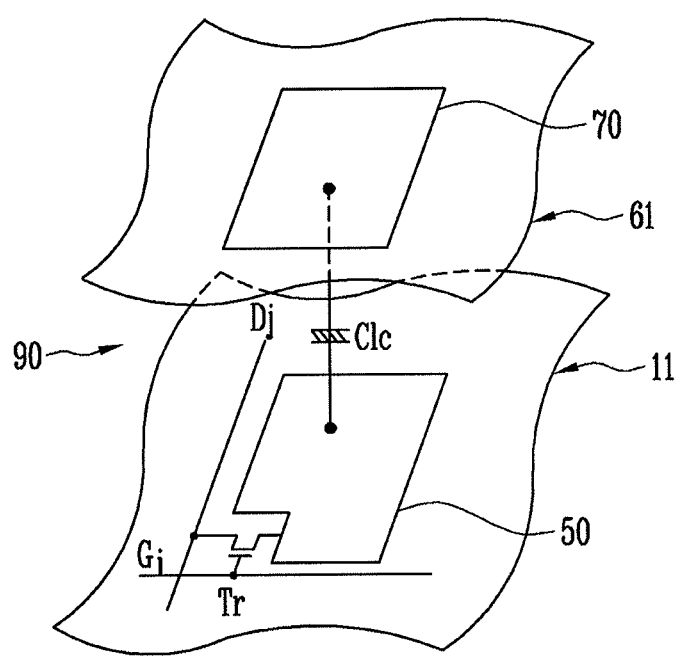
FIG. 2 illustrates an equivalent circuit diagram of a pixel in FIG. 1.
Figure 3:
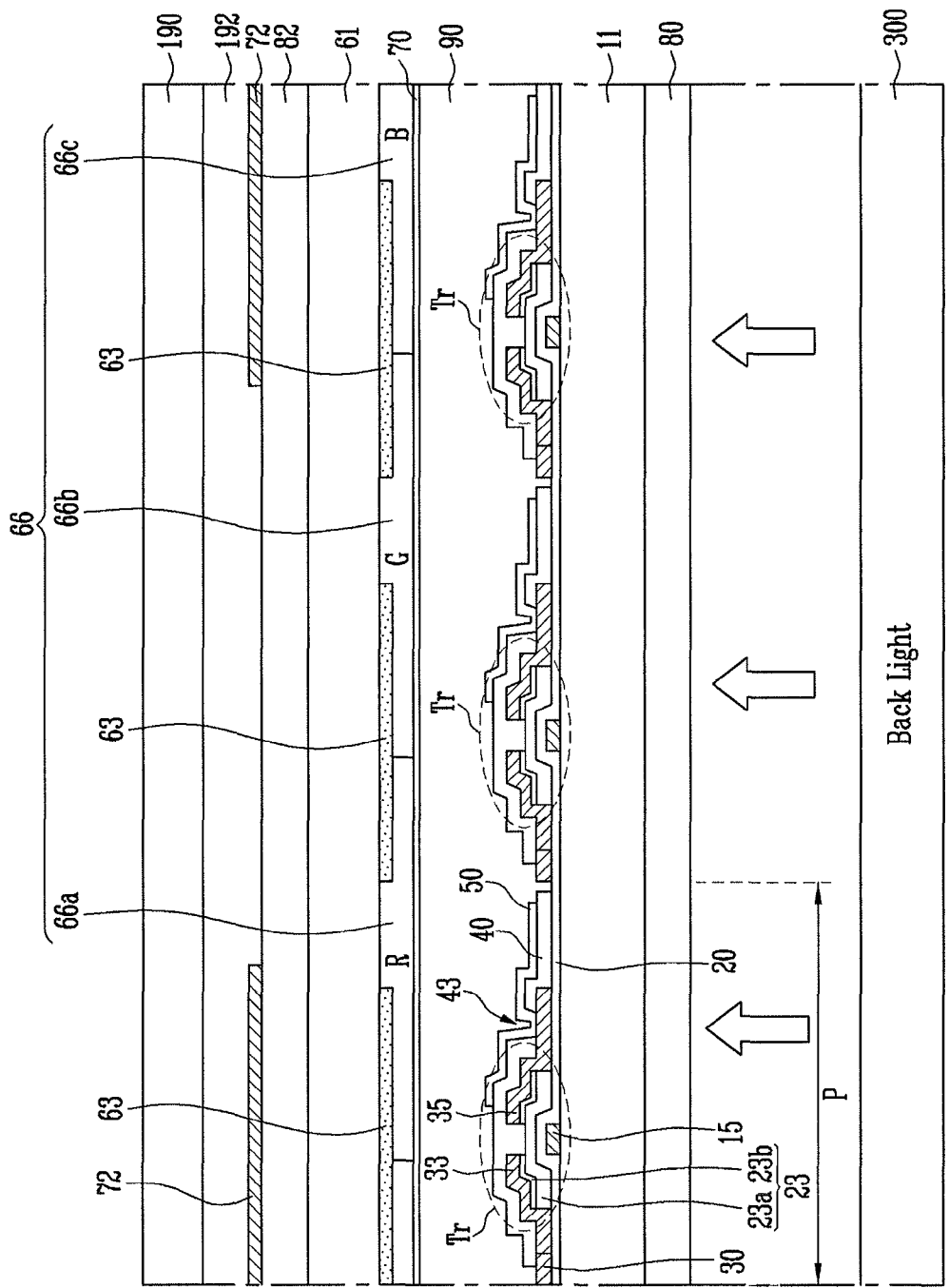
FIG. 3 illustrates a partial cross-sectional view of a LCD with an integrated touch screen panel according to an embodiment.

Hereinafter an exemplary embodiment will be described in detail with reference to FIGS. 1-3. FIG. 1 illustrates a block diagram of a LCD with an integrated touch screen panel according to an embodiment, FIG. 2 illustrates an equivalent circuit diagram of a pixel shown in FIG. 1, and FIG. 3 illustrates a cross-sectional view of an area of the LCD of FIG. 1. It is noted that the configuration of the LCD with the integrated touch screen panel for displaying images is mainly illustrated in FIG. 1.

As illustrated in FIG. 1, an LCD with the integrated touch screen panel according to this embodiment may include a gate driver 3 for supplying a gate signal to gate lines G1 to Gn arranged in a first direction (e.g., a horizontal direction), a data driver 4 for supplying a data signal to data lines D1 to Dm arranged in a second direction (e.g., a vertical direction) intersected with the first direction, a plurality of pixels P respectively having thin film transistors Tr connected to the gate lines G1 to Gn and the data lines D1 to Dm, and a common electrode driver 5 for supplying a common voltage and a driving signal to a common electrode 70. The LCD may further include a timing controller 6 for controlling the gate driver 3, the data driver 4, and the common electrode driver 6.

An LCD is a display that displays an image using the optical anisotropy and polarizing property of liquid crystals. The liquid crystals with a thin and long molecular structure have an optical anisotropy, in which the molecular arrangement of the liquid crystals is directionally oriented, and a polarizing property, in which the molecular arrangement direction of the liquid crystals is changed in an electric field according to their sizes.

Accordingly, the LCD includes a liquid crystal panel. The liquid crystal panel may be configured by joining a first substrate and a second substrate respectively having pixel electrodes and a common electrode, such that the pixel electrodes and the common electrode may face each other with a liquid crystal layer interposed therebetween. A predetermined electric field is formed between the pixel electrodes and the common electrode by applying a data signal and a common voltage to the respective pixel and common electrodes of pixels selected by a gate signal. Therefore, transmittance of light emitted from a back light is then controlled based on the arrangement angle of the liquid crystals, i.e., an arrangement controlled by the electric field, thereby displaying an image.

In detail, as illustrated in FIGS. 2 and 3, the LCD with the integrated touch screen panel has a configuration in which a first substrate 11 and a second substrate 61 are joined together to face each other with a liquid crystal layer 90 interposed therebetween. In the LCD, the gate lines G1 to Gn and the data lines D1 to Dm, which are horizontally and vertically intersecting each other, may be arranged on a top surface of the first substrate 11, e.g., a lower substrate, and the thin film transistors Tr are connected to pixel electrodes 50 formed in the pixels P one by one at the intersection points of the gate lines G1 to Gn and the data lines D1 to Dm.

More specifically, referring to FIG. 2, a pixel P connected to an i-th gate line Gi and a j-th data line Dj includes a thin film transistor Tr connected to the i-th gate line Gi and the j-th data line Dj. Further, the pixel P includes a pixel electrode 50 connected to the thin film transistor Tr, and a liquid crystal capacitor Clc connected to the pixel electrode 50 and the common electrode 70.

As shown in FIG. 3, the thin film transistor Tr may include a gate electrode 15 connected to the gate line, source/drain electrodes 33 and 35, and a semiconductor layer 23 formed between the gate electrode 15 and the source/drain electrodes 33 and 35. Here, the semiconductor layer 23 includes an active layer 23a and an ohmic contact layer 23b.

A gate insulating layer 20 may be formed on the gate electrode 15, and a protection layer 40 may be formed on the source/drain electrodes 33 and 35. A contact hole 43 is formed in the protection layer 40 so that the drain electrode 35 is exposed therethrough. The pixel electrode 50 is formed on a top of the protection layer 40 to be connected to the drain electrode 35 through the contact hole 43.

The liquid crystal capacitor Clc uses the pixel electrode 50 and the common electrode 70 on the second substrate 61 as two terminals, and the liquid crystal layer 90 between the two electrodes 50 and 70 serves as a dielectric substance.

A lattice-shaped black matrix 63, red, green, blue color filter patterns 66a, 66b and 66c, and the common electrode 70 may be formed on the surface of the second substrate 61, e.g., an upper substrate, opposite to the first substrate 11, e.g., to face the first substrate 11. The lattice-shaped black matrix 63 may surround each of the pixels P so as to cover a non-display area including the gate lines G1 to Gn, the data lines D1 to Dm, the thin film transistors Tr, and the like. The red, green, and blue color filter patterns 66a, 66b, and 66c may be sequentially and repeatedly arranged to correspond to the respective pixels P in the interior of the black matrix 63. The common electrode 70 may be formed of a transparent conductive material below the color filter pattern 66, e.g., between the color filter pattern 66 and the liquid crystal layer 90.

An overcoat layer (not shown) may be further formed between the color filter pattern 66 and the common electrode 70. Since the positions of the black matrix 63 and the color filter pattern 66 may be changed, the common electrode 70 may be formed on an inner surface of the second substrate 61, e.g., directly on a surface of the second substrate 61 facing the first substrate 11, when the positions of the black matrix 63 and the color filter pattern 66 are changed.

As shown in FIG. 3, first and second polarizing plates 80 and 82 may be attached to outer surfaces of the first and second substrates 11 and 61, respectively. A window 190 as a transparent substrate may be attached on a polarizing plate in a direction in which an image is displayed, e.g., on the second polarizing plate 82.

The embodiment shown in FIG. 3 has a structure in which a back light 300 is positioned below the first substrate 11, and therefore, an image is displayed in the direction of the second substrate 61. Accordingly, the window 190 is attached on the second polarizing plate 82. In the embodiment shown in FIG. 3, the first polarizing plate 80 is provided, and hence the back light 300 is positioned below the first polarizing plate 80.

The image display operation of the LCD with the integrated touch screen panel having the configuration as described above will be briefly described as follows.

First, if a gate signal is applied to the gate electrode 15 of the thin film transistor Tr provided to each of the pixels P, the active layer 23a is activated. Accordingly, the source electrode 33 transfers a data signal applied from a data line 30 connected to the source electrode 33 to the drain electrode 35 spaced apart from the source electrode 33 at a predetermined interval via the active layer 23a positioned below the source electrode 33.

In this instance, the drain electrode 35 is electrically connected to the pixel electrode 50 through the contact hole 43. Therefore, the voltage of the data signal is applied to the pixel electrode 50, and the applied voltage is stored in a storage capacitor Cst provided to each of the pixels P.

Accordingly, the arrangement of the liquid crystal molecules between the pixel electrode 50 and the common electrode 70 is controlled according to a voltage corresponding to the difference between voltages respectively applied to the pixel electrode 50 and the common electrode 70, thereby displaying a predetermined image.

In the conventional LCD, the common electrode is integrally formed on the entire lower surface of the second substrate 61 to receive the same voltage. However, the LCD with the integrated touch screen panel according to this embodiment may include the common electrode 70 with a plurality of patterns separated from one another, as will be described in more detail below with reference to FIG. 4. Therefore, the common electrode 70 may receive both common voltage and driving signals, so that the plurality of patterns of the common electrode 70 may also be used as driving electrodes of a mutual capacitive touch screen panel.

Figure 4:
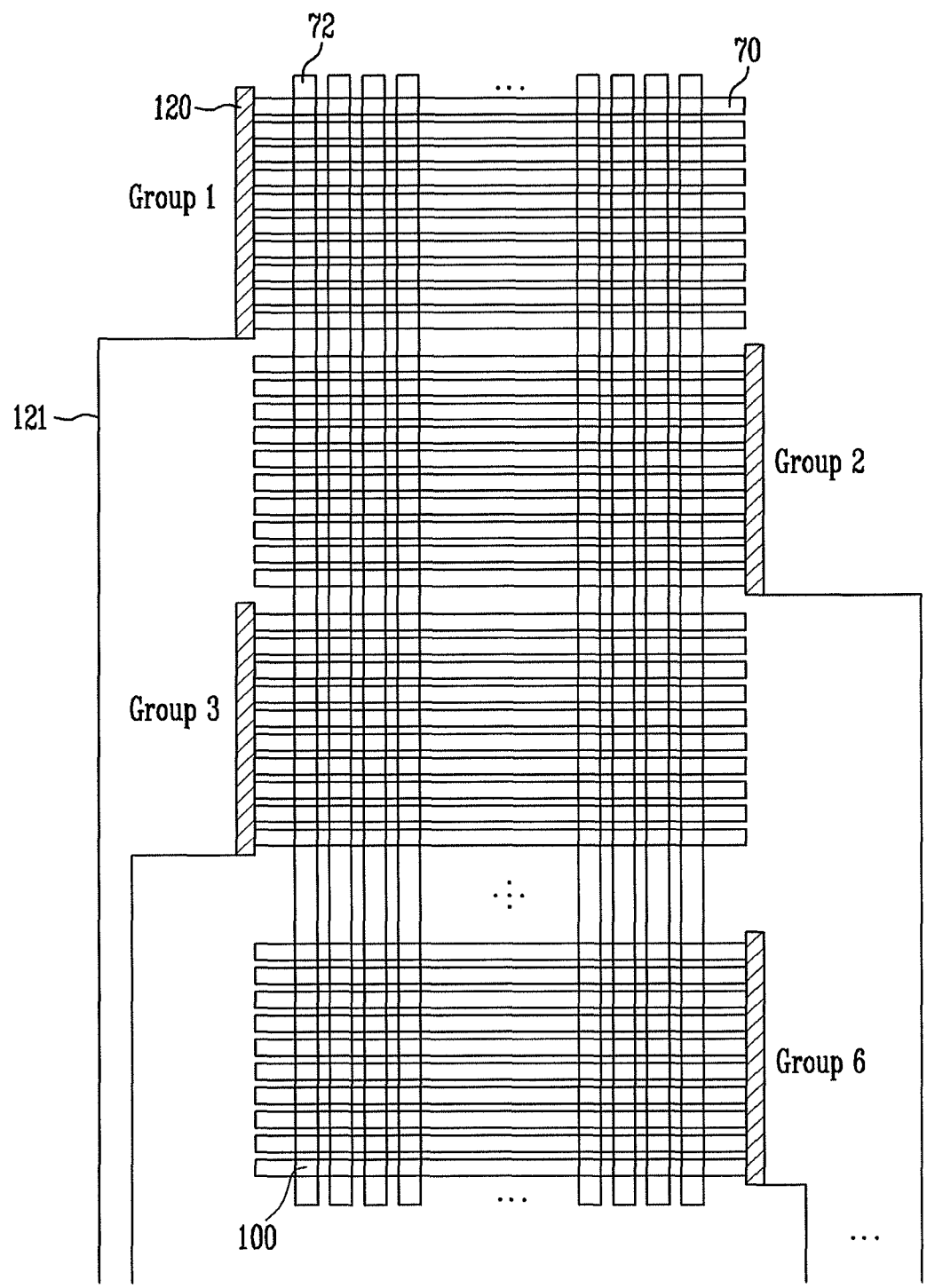
FIG. 4 illustrates a schematic view of an arrangement of common electrode patterns (driving electrodes) and sensing electrodes in FIG. 3.

FIG. 4 illustrates a view of a structure of the patterns of the common electrode 70 (driving electrodes). Referring to FIG. 4, the common electrode 70 of this embodiment may be formed as a plurality of common electrode patterns 70a arranged to be spaced apart at a predetermined interval and to extend in the first direction (e.g., the horizontal direction). For example, the common electrode patterns 70 may extend along the horizontal direction and may be spaced apart from each other along the vertical direction. Thus, the plurality of common electrode patterns 70a may be used as driving electrodes of a mutual capacitive touch screen panel.

For example, the plurality of common electrode patterns 70 may be formed in the same direction to correspond to the respective gate lines G1 to Gn. Accordingly, an i-th common electrode pattern 70a[i] may be connected to one row of pixels connected to an i-th gate line G1. That is, the one row of pixels connected to the i-th gate line G1 connect pixel electrodes 50 respectively included therein to the i-th common electrode 70a[i] through the liquid crystal capacitors Clc. The plurality of common electrode patterns 70a may be divided into sequential groups, so the common electrode driver 5 may supply driving signals to interconnected common electrode patterns 70a within each of the group.

A plurality of sensing electrodes 72 respectively corresponding to the common electrode patterns 70a may be implemented as a plurality of sensing electrode patterns arranged to be spaced apart at a predetermined interval in the second direction (e.g., the vertical direction) intersected with the first direction. In other words, the sensing electrodes 72 and the common electrode patterns 70a may intersect each other to define a grid pattern. The plurality of sensing electrodes 72 are formed at the outside of the second substrate 61, e.g., the second substrate 61 may be between the sensing electrodes 72 and the liquid crystal layer 90.

In a case where the second polarizing plate 82 and the window 190 are provided, the sensing electrodes 72 may be formed between the second substrate 61 and the window 190. For example, the sensing electrodes 72 may be formed on the top surface of the second polarizing plate 82, as shown in FIG. 3, or may be formed on the bottom surface of the window 190. Alternatively, the sensing electrodes 72 may be formed on the top surface of the second substrate 61 or on the bottom surface of the second polarizing plate 82. The sensing electrodes 72 may be formed of a transparent conductive material (e.g., indium tin oxide (ITO)), and may be implemented by attaching a film having the transparent conductive material patterned thereon to the second polarizing plate 82, the window 90, or the like.

Since the common electrode patterns 70a, i.e., driving electrodes, and the sensing electrodes 72 intersect each other, mutual capacitances between the common electrode 70 and the sensing electrodes 72 may be formed at intersection points of the common electrode 70 and the sensing electrodes 72, respectively. The intersection points at which the mutual capacitances are formed may define sensing cells 100 for implementing touch recognition, respectively.

In FIG. 4, the common electrode patterns 70 and the sensing electrodes 72 are formed in a straight bar. However, example embodiments are not limited thereto. For example, the common electrode 70 and the sensing electrodes 72 may be formed in the shape of a diamond or the like.

As an example, the common electrodes 70 and the sensing electrodes 72 may be arranged in the form of orthogonal intersection with each other. In addition, the common electrodes 70 and the sensing electrodes 72 may be arranged in an intersection form of another geometric configuration (a concentric circular or radial line in the polar coordinate arrangement), and the like.

Although it has been illustrated in FIG. 3 that the sensing electrodes 72 are positioned above the second substrate 61 and the common electrodes 70 are positioned below the second substrate 61, the present invention is not limited thereto. That is, the common electrodes 70 and the sensing electrodes 72 may be positioned in the same layer or in different layers from each other at any one of the substrates 11 and 61.

For convenience of illustration, a case where the number of the common electrode patterns 70a is 60 is shown in FIG. 4. It will be apparent that the number of the common electrode patterns 70a may be variously changed. It is further noted that while the common electrode patterns 70a are spaced apart from each other, they may be electrically interconnected for common voltage application, as will described in more detail below.

Figure 5:
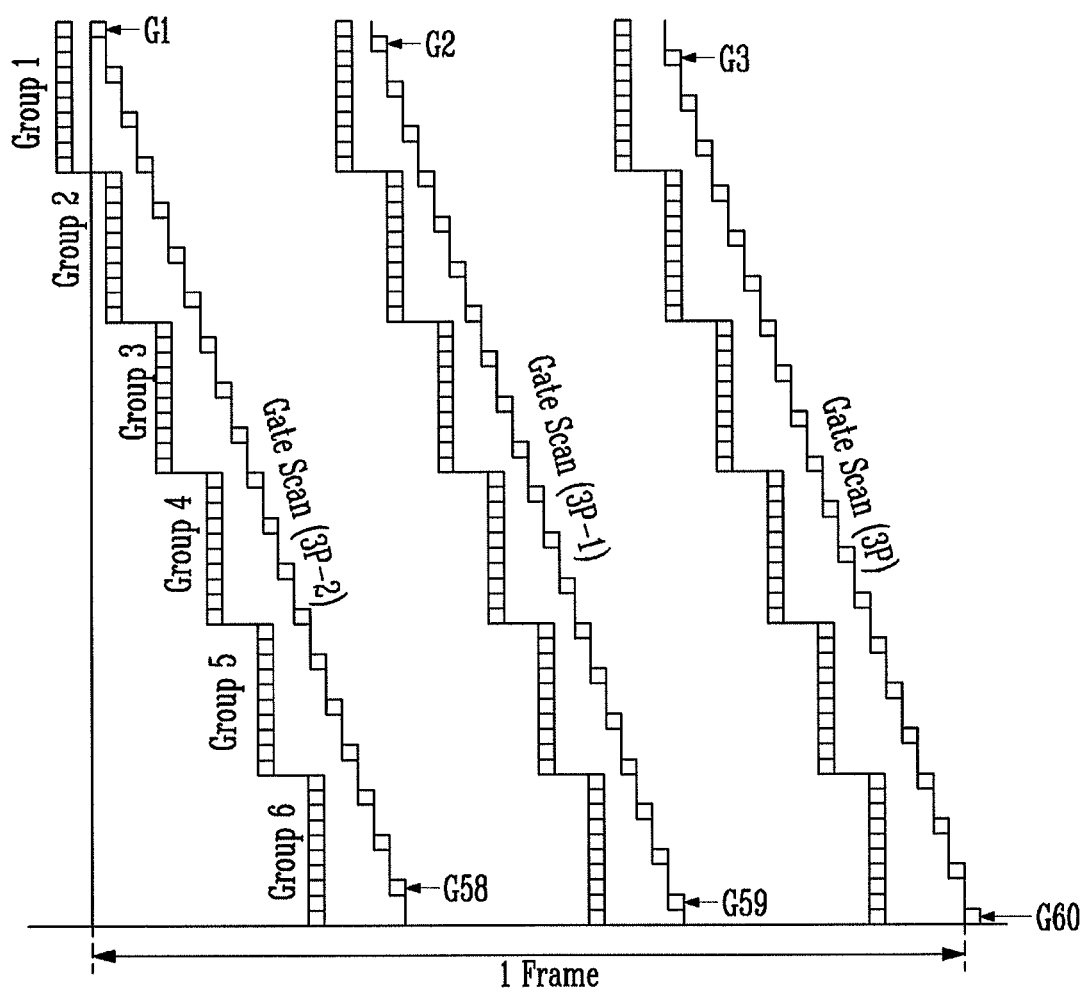
FIG. 5 illustrates a graph of driving a LCD with an integrated touch screen panel according to an embodiment.
Figure 6:
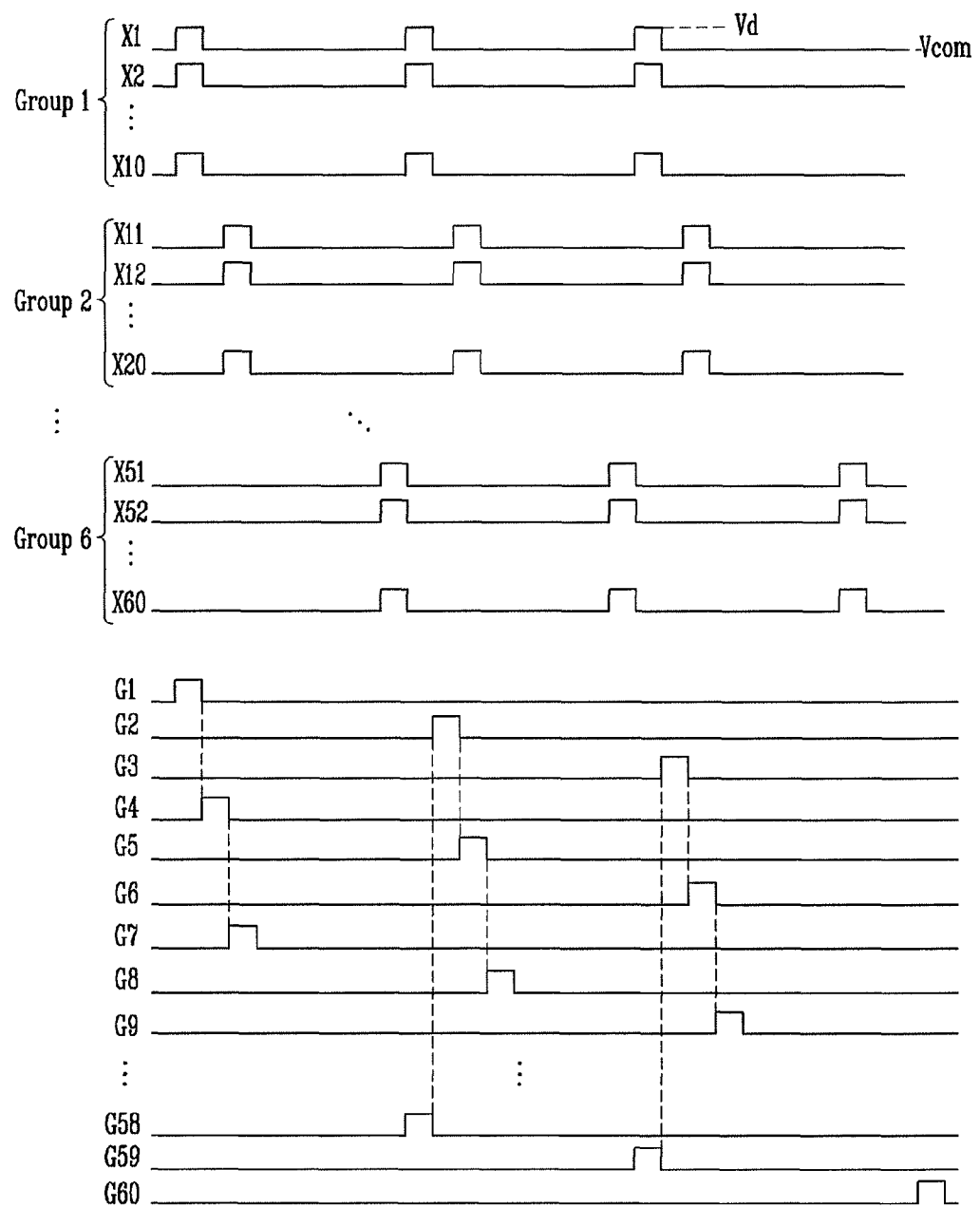
FIG. 6 illustrates a waveform diagram of signals provided by a common electrode driver and a gate driver in the driving graph of FIG. 5.

FIG. 5 illustrates a graph of driving the LCD with the integrated touch screen panel according to an embodiment. FIG. 6 illustrates a waveform diagram of signals provided by a common electrode driver and a gate driver for the purpose of the driving shown in FIG. 5. For convenience, FIGS. 5 and 6 illustrate a case where the number of each of the common electrode patterns 70a and of the gate lines G1 to Gn is 60. In this case, the 60 common electrode patterns 70a include first to 60th common electrodes X1 to X60, and the 60 gate lines include first to 60th gate lines G1 to G60.

In detail, the common electrode patterns 70a may be sequentially divided into a plurality of groups, e.g., six groups, and the common electrode driver 5 may simultaneously supply a driving signal to the common electrode patterns 70a included in each of the groups. The common electrode driver 5 may sequentially supply the driving signal to the groups. In this instance, the common electrodes 70 may be divided in regular sequence so as to form the plurality of groups.

The plurality of groups obtained by sequentially dividing the common electrode patterns 70a may be formed so that a predetermined number of common electrode patterns 70a are formed to be included in each of the groups in sequence from the first common electrode pattern. For example, as shown in FIGS. 4-5, the common electrode patterns 70 may be sequentially divided into six (6) groups, such that each group includes ten (10) common electrode patterns 70a from the first common electrode 70a[1].

That is, the common electrode 70 may be divided into a first group Group 1 from first to 10th common electrode patterns 70a[1] to 70a[10], a second group Group 2 from 11th to 20th common electrode patterns 70a[11] to 70a[20], a third group Group 3 from 21st to 30th common electrodes 70a[21] to 70a[30], a fourth group Group 4 from 31st to 40th common electrodes 70a[31] to 70a[40], a fifth group Group 5 from 41st to 50th common electrodes 70a[41] to 70a[50] and a sixth group Group 6 from 51st to 60th common electrodes 70a[51] to 70a[60]. However, the number of common electrode patterns included in each of the groups may be changed, and the number of groups may also be changed.

As described previously, the common electrode driver 5 may simultaneously supply a driving signal to common electrode patterns included in the same group. The common electrode driver 5 may sequentially supply the driving signal to the groups. For example, as illustrated in FIG. 6, the common electrode driver 5 may simultaneously supply a driving signal, e.g., voltage Vd, to driving electrodes, e.g., electrodes X1 through X10, included in the same group, e.g., Group 1, among the first to sixth groups Group 1 to Group 6. The common electrode driver 5 may sequentially supply the driving signal to the first to sixth groups Group 1 to Group 6. However, there may exist a period in which common voltage Vcom with the same amplitude is supplied between periods in which the driving signal is supplied to each of the groups, e.g., Vcom is applied between pulses of Vd in FIG. 6.

As shown in FIG. 4, common electrode patterns 70a within each group may be connected to each other via a conducting portion 120. In other words, the conducting portions may divide the common electrode 70 into the plurality of groups by electrically connecting common electrode patterns 70a included in each of the groups at an outside of the common electrode. For example, one conducting portion 120 may extend in the second direction to connect outermost edges of the common electrode patterns 70a in each group. The conducting portions 120 may be formed of a transparent conductive material (e.g., ITO) or metal. In a case where the conducting portions 120 are formed, a number of common electrode lines 121 that connect the common electrode patterns 70a to the common electrode driver 5 may be decreased.

The common voltage Vcom refers to voltage identically supplied to each of the common electrode patterns 70, so that an image is displayed in the LCD. The common voltage Vcom is applied to all the common electrode patterns 70a.

The driving signal is used to determine a touch position, and may be a higher voltage Vd than the common voltage Vcom. When a finger or an object touches a position on the screen, i.e., a position corresponding to a sensing electrode 72, and a driving signal is sequentially supplied to the groups, the sensing cell 100 at an intersection of the touched sensing electrode 72 and a common electrode pattern 70a receiving the driving signal may sense the touch according to change in capacitance. That is, voltage generated by a change in mutual capacitance is sensed, thereby determining a touch position.

The number of times at which the driving signal is supplied to the common electrode 70 as described above may be increased so as to better sense the touch position. However, in a case where a gate signal is supplied to each of the gate lines G1 to Gn so as to display an image, a common voltage Vcom is necessarily supplied to a common electrode pattern 70a corresponding to the activated gate line, rather than a driving signal. When a driving signal is supplied to the common electrode 70 during gate activation, the voltage applied to the common electrode 70 is the voltage of the driving signal, rather than the common voltage Vcom, thereby causing an error in image quality.

Further, according to an embodiment, for a plurality of groups composed of the gate lines G1 to Gn, the gate driver 3 according to this embodiment sequentially supplies a gate signal to gate lines included in each of groups.

Unlike the common electrode 70 divided so that a predetermined number of common electrode patterns 70a are sequentially included in each of the groups, the gate lines G1 to Gn are divided into a plurality of groups based on a predetermined sequence difference. That is, the gate lines G1 to Gn may be sequentially arranged from the first gate line G1 positioned on a first row to the n-th gate line Gn positioned on the last row, and the difference between numbers given in such a sequence is defined as a sequence difference.

For example, in a configuration of sixty (60) common electrode patterns 70a, sixty (60) gate lines G1 to Gn may be divided into groups based on a sequence difference of three (3). That is, a first group may include a first gate line G1, a fourth gate line G4, a seventh gate line G7, . . . , a 55th gate line G55, and a 58th gate line G58. Similarly, a second group may include a second gate line G2, a fifth gate line G5, an eighth gate line G8, . . . , a 56th gate line G56 and a 59th gate line G59, and a third group may include a third gate line G3, a sixth gate line G6, a ninth gate line G9, . . . , a 57th gate line G57, and a 60th gate line G60.

Consequently, the first group may be configured as gate lines having numbers of 3P−2, the second group may be configured as gate lines having numbers of 3P−1, and the third group may be configured as gate lines having number of 3P (here, P is a natural number).

However, the sequence difference is not limited to three but may be changed into a natural number of two or more. Similarly, the number of groups formed based on the change in sequence difference may also change. For a plurality of groups divided in the aforementioned manner, the gate driver 3 may sequentially supply a gate signal to gate lines included in each of the groups.

In a case where the plurality of groups is divided into three, as described in the aforementioned example, the gate driver 3 may sequentially supply a gate signal to the first gate line G1, the fourth gate line G4, the seventh gate line G7, . . . , the 55th gate line G55, and the 58th gate line G58. Then, the gate driver 3 may sequentially supply the gate signal to the second gate line G2, the fifth gate line G5, the eighth gate line G8, . . . , the 56th gate line G56, and the 59th gate line G59. Then, the gate driver 3 may sequentially supply the gate signal to the third gate line G3, the sixth gate line G6, the ninth gate line G9, . . . , the 57th gate line G57, and the 60th gate line G60.

The supply of the gate signal by the gate driver 3 to each of the groups may be sequentially performed during a frame period, thereby displaying an image of one frame on a screen. The supply of the driving signal to each of the groups by the common electrode driver 5 may be alternately performed with the supply of the driving signal to each of the group by the gate driver 3.

Accordingly, although the common voltage Vcom is supplied, rather than the driving signal, to the common electrode pattern 70a corresponding to the gate line to which the gate signal is supplied, the number of times at which the driving signal is supplied may be increased in accordance with a number of groups obtained by dividing the gate lines G1 to Gn. Thus, it may be possible to enhance touch sensitivity.

Figure 7:
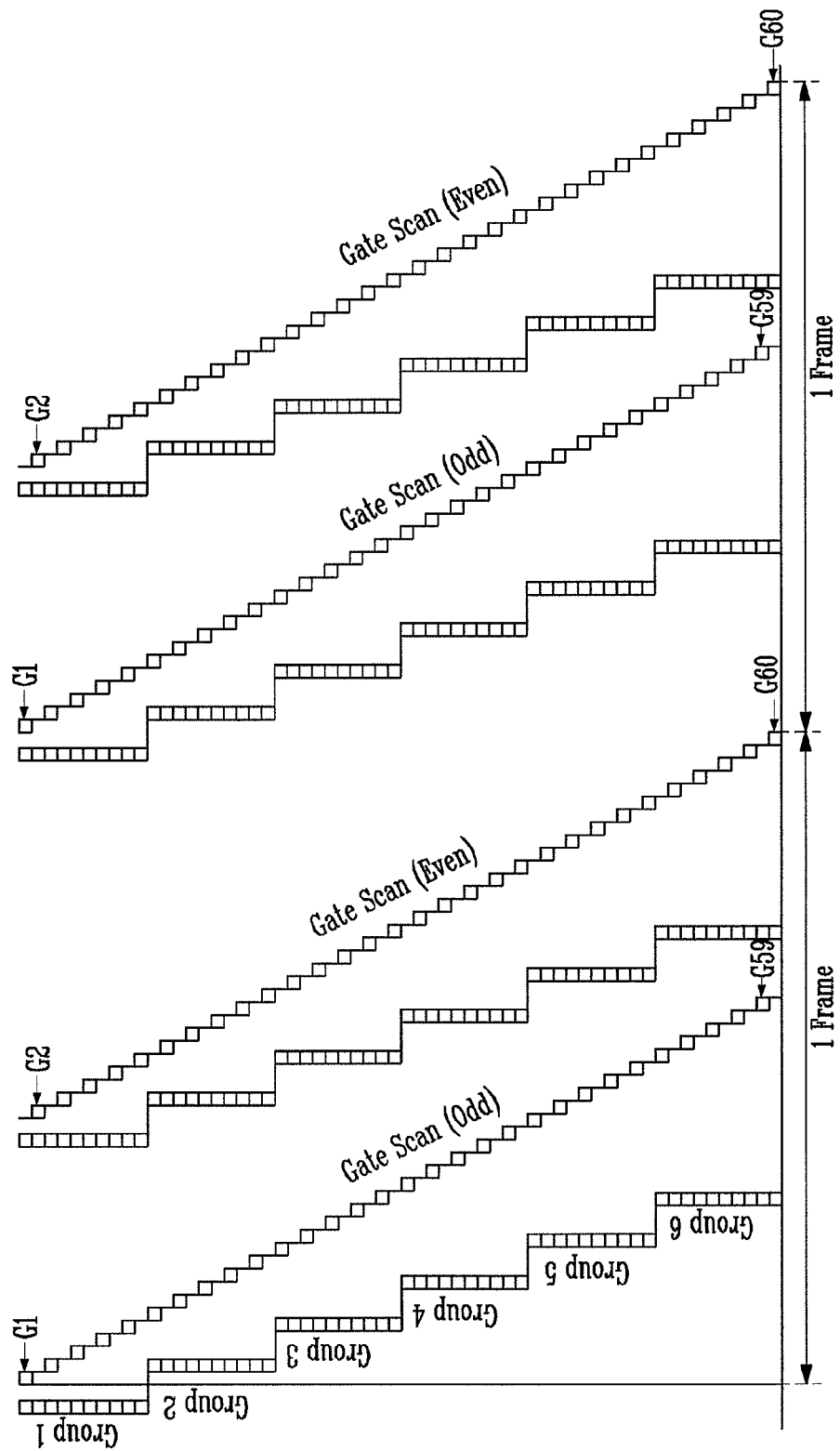
FIG. 7 illustrates a graph of driving a LCD with an integrated touch screen panel according to another embodiment.
Figure 8:
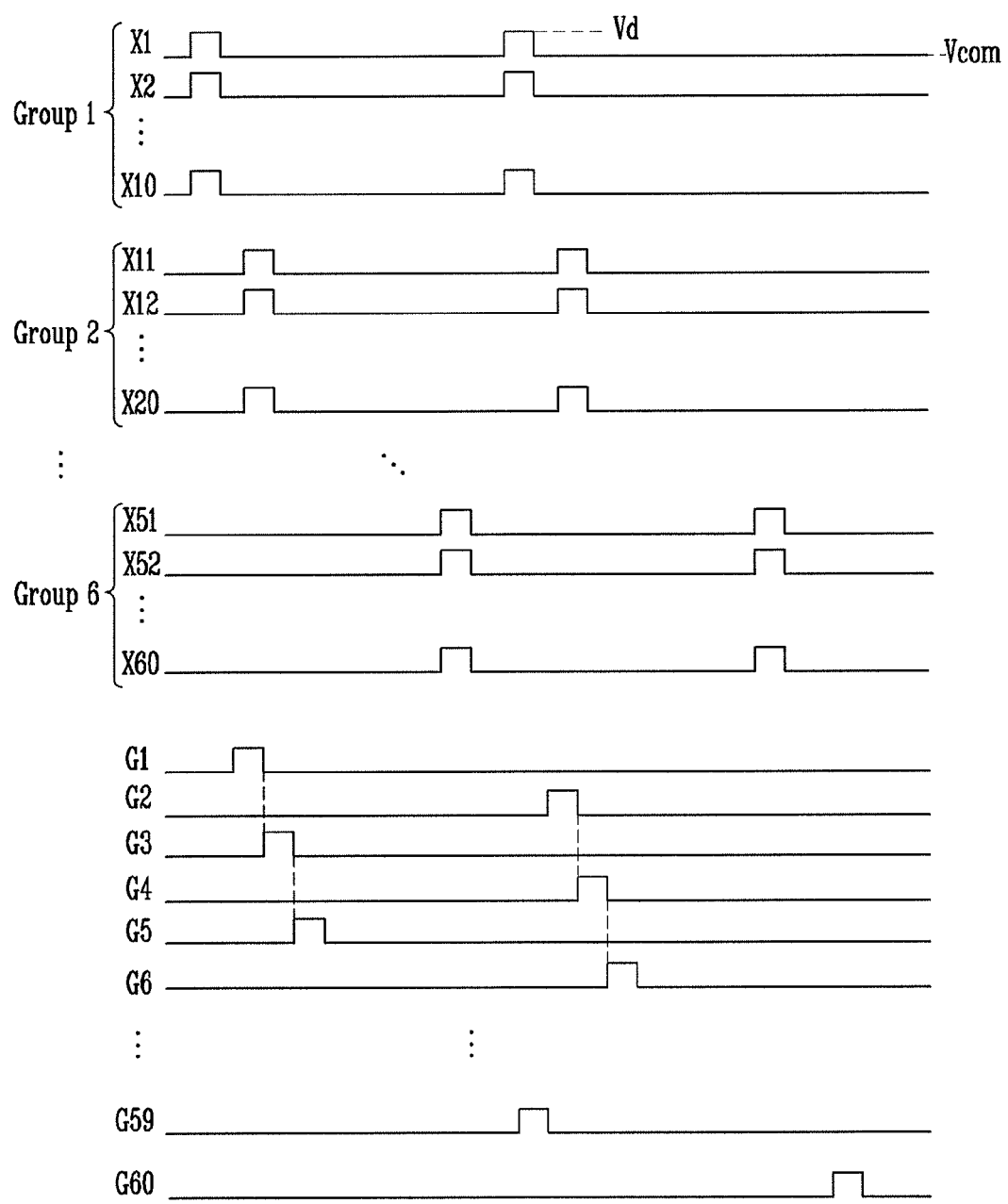
FIG. 8 illustrates a waveform diagram of signals provided by a common electrode driver and a gate driver in the driving graph of FIG. 7.

FIG. 7 illustrates a graph of driving a with the integrated touch screen panel according to another embodiment. FIG. 8 illustrates a waveform diagram of signals provided by the common electrode driver and the gate driver for the purpose of the driving in FIG. 7.

In the embodiment illustrated in FIGS. 7-8, a case where the gate lines G1 to Gn have a sequence difference of two is shown. That is, in a case where the gate lines G1 to G60 have a sequence difference of two, a first group includes the first gate line G1, the third gate line G3, the fifth gate line G4, . . . , the 57th gate line G57 and the 59th gate line G59, and a second group includes the second gate line G2, the fourth gate line G4, the sixth gate line G6, . . . , the 58th gate line G58 and the 60th gate line G60. Consequently, in a case where the sequence difference is two, the plurality of gate lines are divided into odd-numbered gate lines and even-numbered gate lines.

Thus, the gate driver 3 may sequentially supply a gate signal to the first group configured as the odd-numbered gate lines during a frame period. Then, the gate driver 3 may sequentially supply the gate signal to the second group configured as the even-numbered gate lines during the frame period.

Like the embodiment described with reference to FIGS. 5 and 6, the supply of the driving signal to each of the groups by the common electrode driver 5 may be alternately performed with the supply of the driving signal to each of the group by the gate driver 3.

Figure 9:
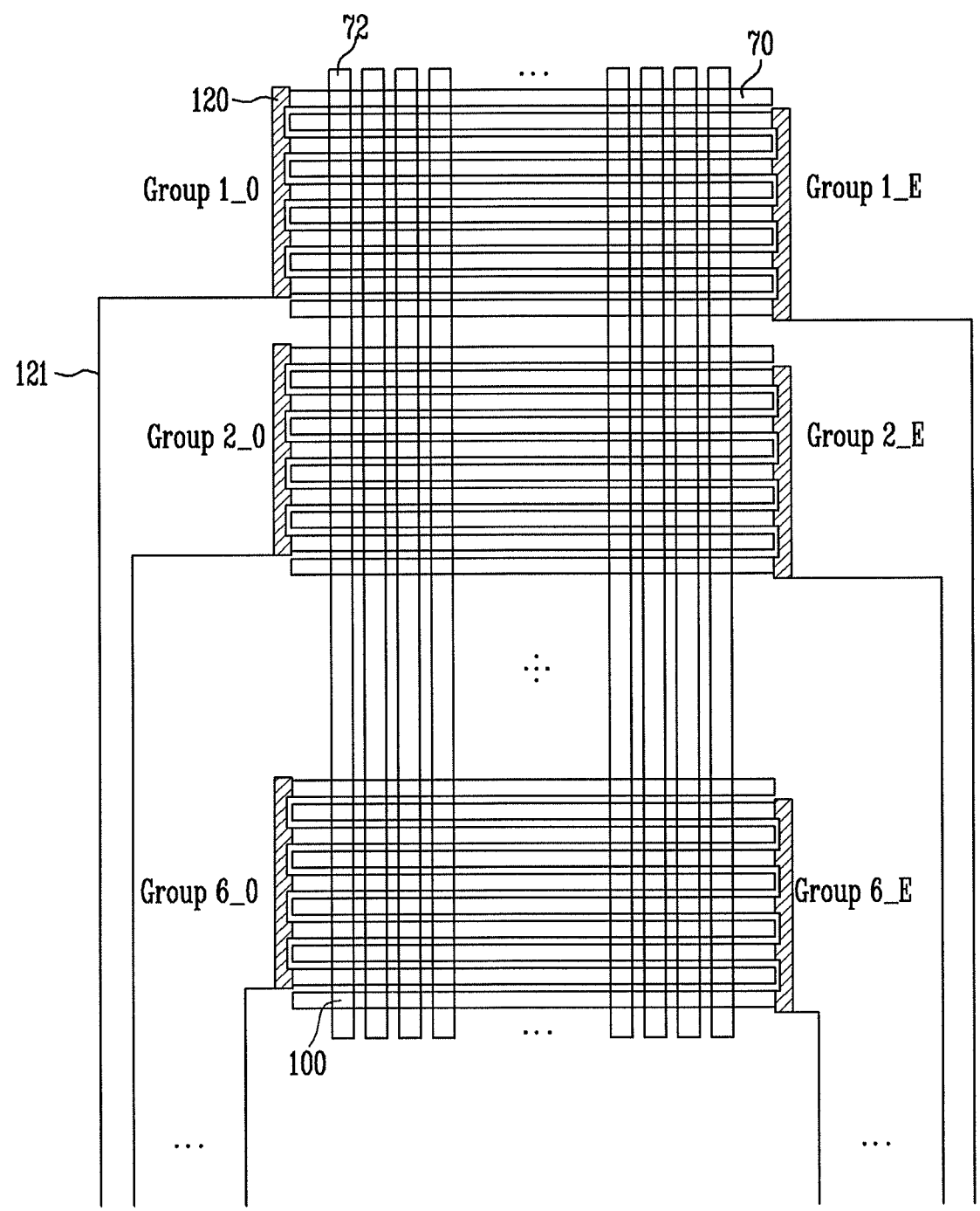
FIG. 9 illustrates a schematic view of an arrangement of common electrode patterns and sensing electrodes according to another embodiment.
Figure 10:
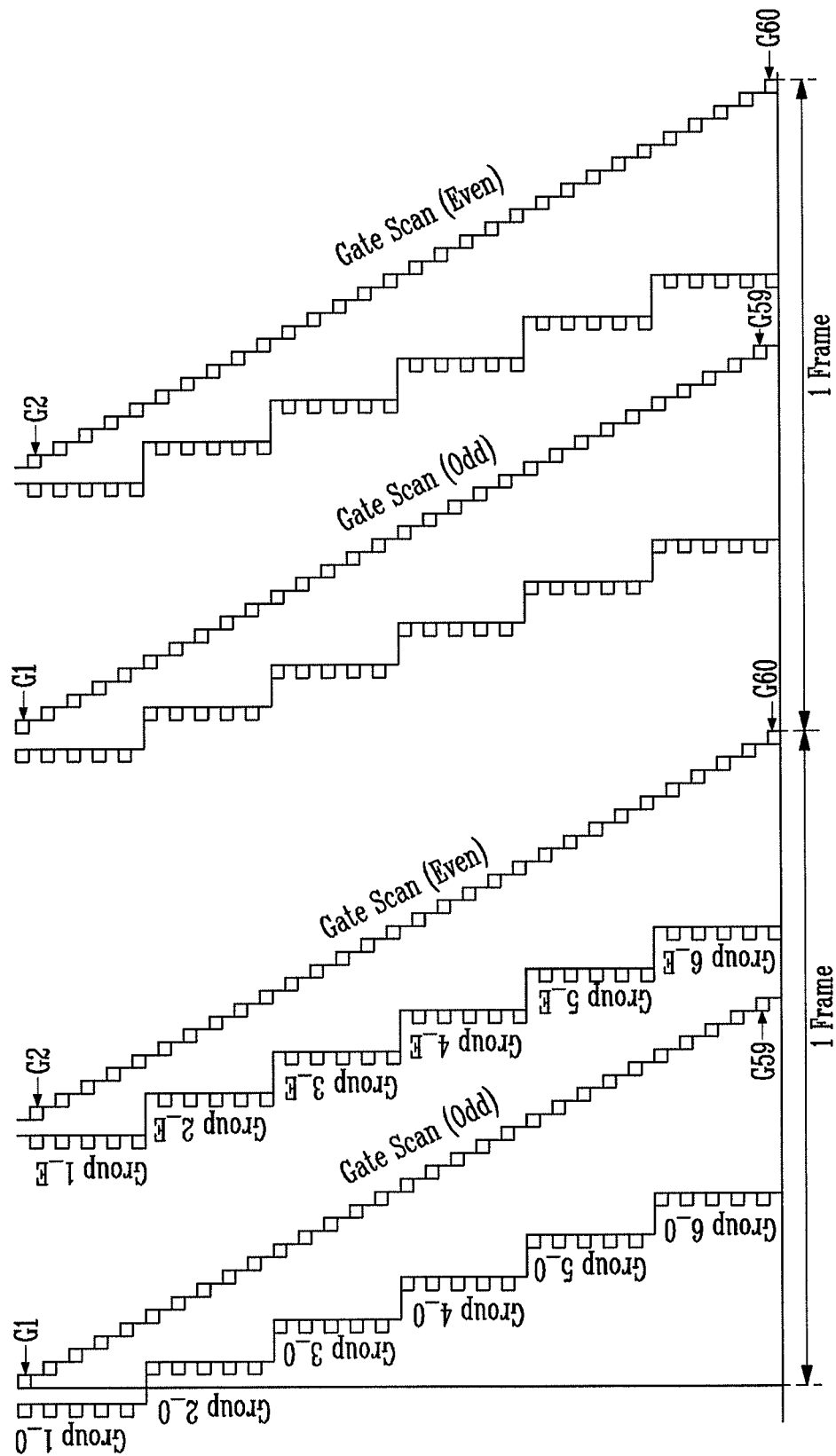
FIG. 10 illustrates a graph of driving a LCD with an integrated touch screen panel according another embodiment.
Figure 11:
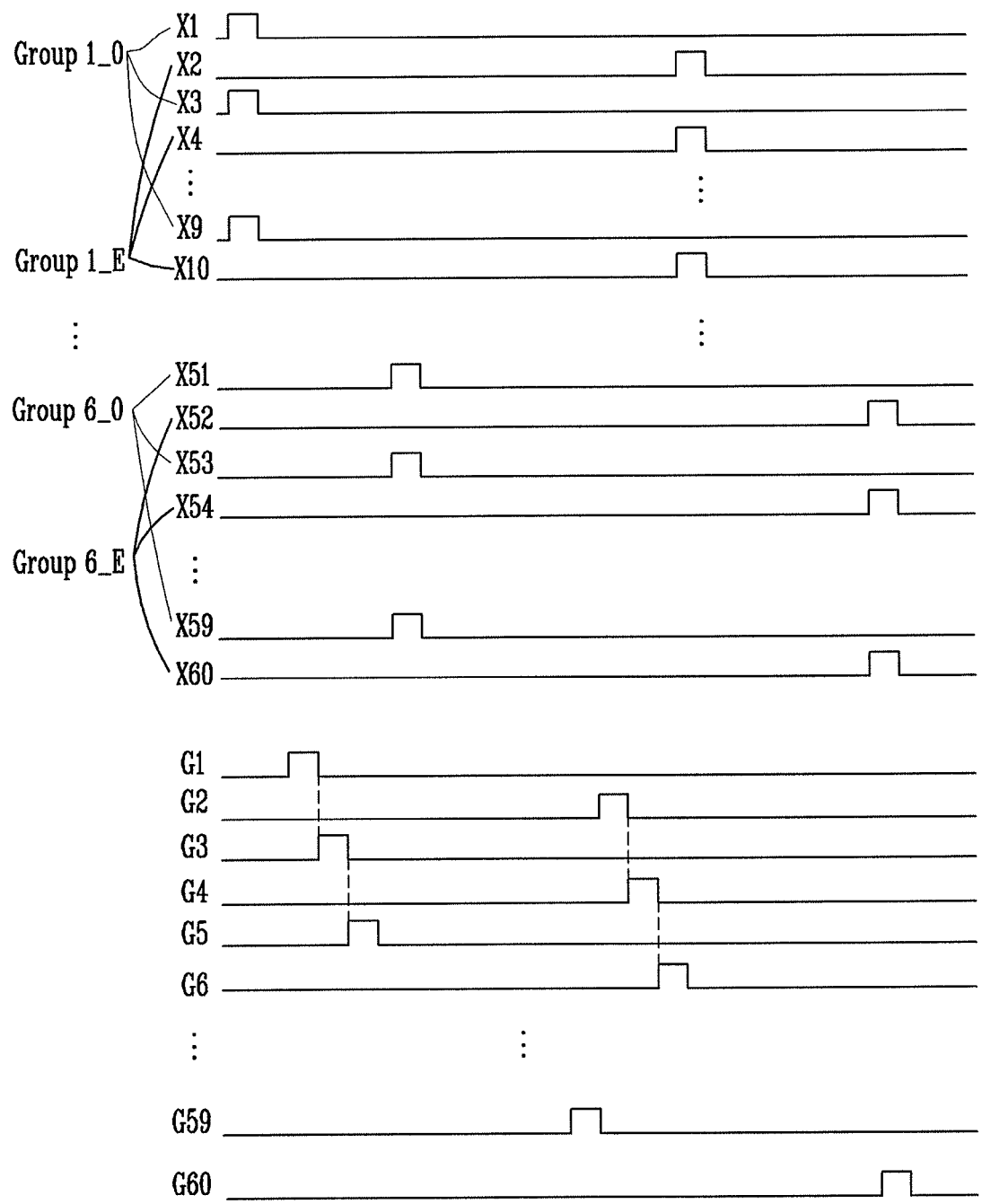
FIG. 11 illustrates a waveform diagram of signals provided by a common electrode driver and a gate in the driving graph of FIG. 10.

FIG. 9 illustrates a view of common electrode patterns (driving electrodes) and sensing electrodes according to another embodiment. FIG. 10 illustrates a graph of driving a LCD with an integrated touch screen panel according to another embodiment. FIG. 11 illustrates a waveform diagram of signals provided by the common electrode driver and the gate driver in the driving of FIG. 10.

Referring to FIGS. 10 and 11, for a plurality of groups divided into groups obtained by dividing odd-numbered common electrodes based on a sequence difference and groups obtained by dividing even-numbered common electrodes based on a sequence difference, the common electrode driver 5 according to this embodiment simultaneously supplies a driving signal to common electrodes included in each of the groups. The common electrode driver 5 sequentially supplies the driving signal to each of the groups including the odd-numbered common electrodes. The common electrode driver 5 sequentially supplies the driving signal to each of the groups including the even-numbered common electrodes.

The operation of the gate driver 3 that supplies a gate signal to the gate lines G1 to Gn is identical to that in the embodiment described with reference to FIGS. 7 and 8. However, in this embodiment, the common electrode patterns 70a may be sequentially divided with respect to the odd-numbered and even-numbered common electrodes. In other words, a predetermined number of odd-numbered common electrodes from the first common electrode X1 that is a first common electrode among the odd-numbered common electrodes are included in each of the groups, and a predetermined number of even-numbered common electrodes from the second common electrode X2 that is a first common electrode among the even-numbered common electrodes are included in each of the groups.

For example, as shown in FIG. 10, the odd-numbered common electrodes are divided into a first group Group 1_O including a first common electrode X1, a third common electrode X3, a fifth common electrode X5, a seventh common electrode X7 and a ninth common electrode X9; a second group Group 2_O including an 11th common electrode X11, a 13th common electrode X13, a 15th common electrode X15, a 17th common electrode X17 and a 19th common electrode X19; a third group Group 3_O including a 21st common electrode X21, a 23rd common electrode X23, a 25th common electrode X25, a 27th common electrode X27 and a 29th common electrode X29; a fourth group Group 4_O including a 31st common electrode X31, a 33rd common electrode X33, a 35th common electrode X35, a 37th common electrode X37 and a 39th common electrode X39; a fifth group Group 5_O including a 41st common electrode X41, a 43rd common electrode X43, a 45th common electrode X45, a 47th common electrode X47 and a 49th common electrode X49; and a sixth group Group 6_O including a 51st common electrode X51, a 53rd common electrode X53, a 55th common electrode X55, a 57th common electrode X57 and a 59th common electrode X59.

The even-numbered common electrodes are divided into a first group Group 1_E including a second common electrode X2, a fourth common electrode X4, a sixth common electrode X6, an eighth common electrode X8 and a tenth common electrode X10; a second group Group 2_E include a 12th common electrode X12, a 14th common electrode X14, a 16th common electrode X16, an 18th common electrode X18 and a 20th common electrode X20; a third group Group 3_E including a 22nd common electrode X22, a 24th common electrode X24, a 26th common electrode X26, a 28th common electrode X28 and a 30th common electrode X30; a fourth group Group 4_E including a 32nd common electrode X32, a 34th common electrode X34, a 36th common electrode X36, a 38th common electrode X38 and a 40th common electrode X40; a fifth group Group 5_E including a 42nd common electrode X42, a 44th common electrode X44, a 46th common electrode X46, a 48th common electrode X48 and a 50th common electrode X50; and a sixth group Group 6_E including a 52nd common electrode X52, a 54th common electrode X54, a 56th common electrode X56, a 58th common electrode X58 and a 60th common electrode X60.

In this instance, the common electrode driver 5 may simultaneously supply a driving signal to the common electrode patterns 70a included in the same group. For example, the common electrode driver 5 may simultaneously supply a driving signal to the common electrode patterns X1, X3, X5, X7, and X9 in Group 1_O. For the plurality of groups including the odd-numbered common electrode patterns and the plurality of groups including the even-numbered common electrode patterns, the common electrode driver 5 may sequentially supply the driving signal to each of the groups.

That is, as shown in FIGS. 10 and 11, the common electrode driver 5 may sequentially supply the driving signal to the first group Group 1_O through the sixth group Group 6_O, i.e., the plurality of groups including the odd-numbered common electrode patterns. The common electrode driver 5 may sequentially supply the driving signal to the first group Group 1_E through the sixth group Group 6_E, i.e., the plurality of groups including the even-numbered common electrodes.

To this end, as shown in FIG. 9, a conducting portion 120 may be formed to electrically connect common electrodes at an outside of the common electrode patterns 70a included in each of the first to sixth groups Group 1_O to Group 6_O configured as the odd-numbered common electrode patterns and the first to sixth groups Group 1_E to Group 6_E configured as the even-numbered electrodes.

In this instance, the supply of the driving signal to the plurality of groups configured as the odd-numbered common electrode patterns may be performed before the supply of the driving signal to the plurality of groups configured as the odd-numbered gate lines. The supply of the driving signal to the plurality of groups configured as the even-numbered common electrode patterns may be performed before the supply of the driving signal of to plurality of groups configured as the even-numbered gate lines.

That is, after a driving signal is sequentially supplied to the first to sixth groups Group 1_O to Group 6_O configured as the odd-number common electrodes, a gate signal is sequentially supplied to the odd-numbered gate lines. After the driving signal is sequentially supplied to the first to sixth groups Group 1_E to Group 6_E configured as the even-numbered common electrodes, the gate signal is then sequentially supplied to the even-numbered gate lines.

As described above, according to embodiments, a LCD with an integrated touch screen panel may include a common electrode that may be used both as an electrode to display an image on the LCD screen and as a driving electrode of a capacitive touch screen panel. Therefore, using a same electrode for different functions may reduce process time and cost, and may decrease the thickness of the LCD. Also, it may be possible to increase touch sensitivity without the degradation of image quality.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A liquid crystal display (LCD) with an integrated touch screen panel, comprising:
    a plurality of pixels connected to a plurality of data lines and a plurality of gate lines, the gate lines being divided into a plurality of groups;
    a plurality of sensing electrodes;
    a plurality of common electrodes divided into a plurality of groups;
    a common electrode driver configured to simultaneously supply a driving signal
    to common electrodes within each group of the plurality of groups of the common electrodes, and to sequentially supply the driving signal to the plurality of groups of the common electrodes; and a gate driver configured to sequentially supply a gate signal to gate lines within each of the plurality of group of the gate lines;

wherein the common electrode driver is configured to supply a same common voltage to all the common electrodes, except during a period in which the driving signal is supplied.

2. The LCD as claimed in claim 1, further comprising:
first and second substrates spaced apart from each other; and
a liquid crystal layer between the first and second substrates.

3. The LCD as claimed in claim 2, wherein the sensing electrodes and the common electrodes are positioned in a same layer or in different layers from each other at any one of the substrates.

4. The LCD as claimed in claim 1, wherein the sensing electrodes and the common electrodes intersect each other.

5. The LCD as claimed in claim 1, wherein the common electrodes define a plurality of groups divided in a regular sequence.

6. The LCD as claimed in claim 1, wherein the gate lines define a plurality of groups divided based on a predetermined sequence difference.

7. The LCD as claimed in claim 1, wherein the supply of the driving signal by the common electrode driver and the supply of the gate signal by the gate driver are alternately performed.

8. The LCD as claimed in claim 1, wherein the driving signal has a higher voltage than the common voltage.

9. The LCD as claimed in claim 1, wherein, for two groups divided into odd-numbered gate lines and even-numbered gate lines, the gate driver is configured to sequentially supply a gate signal to gate lines included in each of the groups of gate lines.

10. The LCD as claimed in claim 9, wherein the supply of the driving signal by the common electrode driver and the supply of the gate signal to each of the groups by the gate driver are alternately performed.

11. The LCD as claimed in claim 9, wherein, for a plurality of groups obtained by respectively dividing odd-numbered common electrodes and even-numbered common electrodes based on sequence differences, the common electrode driver simultaneously supplies a driving signal to common electrodes included in each of the groups, sequentially supplies the driving signal to the plurality of groups configured as the odd-numbered common electrodes, and sequentially supplies the driving signal to the plurality of groups configured as the even-numbered common electrodes.

12. The LCD as claimed in claim 11, wherein the supply of the driving signal to the plurality of groups configured as the odd-numbered common electrodes is performed before the supply of the gate signal to the group configured as the odd-numbered gate lines, and the supply of the driving signal to the plurality of groups configured as the even-numbered common electrodes is performed before the supply of the gate signal to the group configured as the even-numbered gate lines.

* * * * *